United States Patent Office 2,867,192
Patented Jan. 6, 1959

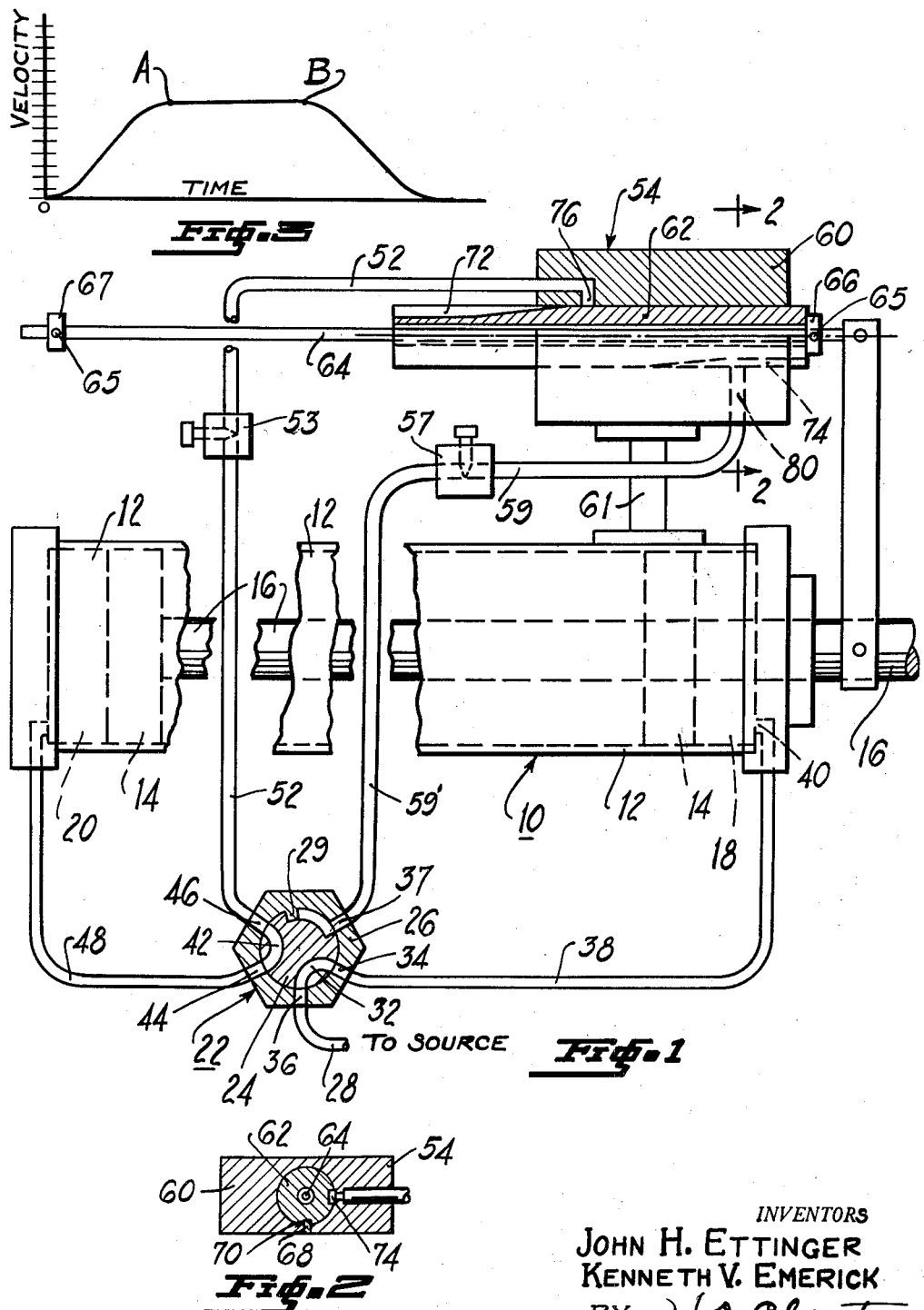

2,867,192

STAGE MOTOR

John H. Ettinger and Kenneth V. Emerick, South Bend, Ind., assignors to Bendix Aviation Corporation, South Bend, Ind., a corporation of Delaware Application October 10, 1955, Serial No. 539,492

2 Claims. (Cl. 121—38)

This invention relates in general to a device for controlling the movement of a work piece such as a part of an automotive brake being combined, by an assembly mechanism, with other brake parts to complete the brake unit; and in particular this invention relates to a device for controlling the deceleration of said work piece as it is being worked upon. The so-called work piece being moved is, of course, mounted in a clamp or other housing and the device constituting our invention serves to control the movement of the two as a unit.

In a brake assembly machine it is desirable at times to move a brake part or other load from one position to another in a plurality of stages and it is an object of our invention to provide a device for moving a load a certain distance in a relatively short period of time, all but the last stage of said movement being relatively quickly effected and the last or decelerating stage of said movement also being relatively quickly and smoothly effected to avoid subjecting the brake part to an undesirable shock.

It is a further object of our invention to provide means for controlling the movement of a mass said means including a double acting double ended pressure differential operated motor the pressure exerted by the power fluid within said motor being controlled in large measure by a flow control valve actuated by the power element of the motor.

Yet another object of our invention is to provide a double acting fluid pressure motor controlled by a plurality of valves one of the same being controlled by means actuated by the power element of the motor and operative as a function of its position, and another of said valves being controlled by a manually adjustable means.

A further object of our invention is to provide a compact and effective load controlling pressure differential operated motor well suited for installation in mechanisms such as a brake assembly machine.

A further object of our invention is to provide a fluid pressure motor operable to move a load a relatively short distance in a relatively short period of time without subjecting the load to a severe and damaging shock; that is, a shock which would result from subjecting the load to a relatively high deceleration.

Yet another object of our invention is to provide a fluid pressure motor controlled in large measure by a valve fixedly mounted on the casing of the motor and actuated by the power element thereof. As one of the features of our invention this valve, by virtue of its particular construction, need not be in exact alignment with the motor thereby insuring a correct operation of the valve; and another feature of our invention lies in so constructing the valve and positioning the same with respect to the operating means therefor as to minimize the wear of the valve.

Other objects of the invention and desirable details of construction of parts will become apparent from the following detailed description of an illustrative embodiment of the invention, taken in conjunction with the accompanying drawings illustrating said embodiment in which:

Figure 1 is a diagrammatic view, showing certain parts in section, disclosing the details of the load controlling fluid pressure operated motor and control means constituting our invention;

Figure 2 is a sectional view, taken on the line 2—2 of Figure 1, disclosing details of one of the control valves of the mechanism of Figure 1; and Figure 3 is a velocity, time graph, indicating the movement of the load controlled by the device of Figure 1.

Referring now to Figure 1, disclosing a preferred embodiment of our invention, a fluid pressure operated motor, indicated by the reference numeral 10, includes a double ended tubular casing 12 housing a piston 14 reciprocable therein. This piston, that is power element of the motor, is connected to a load, not shown, by a rod 16. The load may, for example, be a part of a brake secured to a clamp said part to be combined with other brake parts to make up an automotive brake unit. In a mechanism for assembling the parts of such a unit it is often desirable, in the interests of minimizing the time required to assemble the unit, to move a load a relatively short distance in a relatively short period of time without however, subjecting the load to damaging shocks; and our invention is designed to effect this end.

The mode of movement of the piston 14, and therefore the mode of movement of the load, is controlled by controlling the forces acting upon said piston during its power stroke to the right and its power stroke to the left, Figure 1. The force acting upon the piston tending to move it to the left to the extreme left dotted line position disclosed in Figure 1 is the force exerted by the power fluid in a chamber 18 of the motor; and the forces opposing this force, and effective to maintain for a certain time a constant or substantially constant velocity of the piston once it has reached the desired velocity and to then decelerate the piston are, in a large measure, the forces exerted by the power fluid in a chamber 20 of the motor. When the piston and its connected load is moved to the right to the rightward dotted line position disclosed in Figure 1, the controlling effect of the fluid pressures in the chambers 18 and 20 is the reversal of the aforementioned control; for then the fluid pressure in the chamber 20 determines the force to effect a movement of the piston and its connected load to the right; and the fluid pressure in the chamber 18 in large measure determines the force controlling the mode of movement of the piston in this direction once its movement has been initiated by the force exerted by the fluid within the chamber 20.

Describing now the means for controlling the fluid pressures within the chambers 18 and 20 a 4-way valve 22, preferably power actuated, admits fluid, preferably air, into one or the other of said chambers. To effect this end a rotatable cylindrically shaped valve member 24, housed within a casing 26, is rotated clockwise to the position disclosed in Figure 1 to connect the compartment 18 with a conduit 28 leading to a source of air under pressure, not shown; and when the member 24 is rotated counterclockwise from the position disclosed in Figure 1 the conduit 28 is connected to the compartment 20 of the motor. A stop 29, secured to the casing 26 serves to limit this clockwise rotational movement of the valve 24. Describing in greater detail the operation and structure of the valve 22 when the member 24 abus the stop 29 a U-shaped duct 32 in the member 24 registers with ports 34 and 36 in the valve casing. The conduit 28 is then connected to the port 36 and a conduit 38 is connected at one of its ends to the port 34 and at its other end with a port 40 in the motor casing the latter port registering with the motor chamber 18; and when the valve member 24 is in the position disclosed in Figure 1, a U-shaped duct 42 in said member serves, via a conduit 48 and a conduit 52, to interconnect the compartment 20 with a manually controlled bleed valve 53 and a flow control valve 54. In this operation of venting the air in the chamber 20 with the atmosphere, ports 44 and 46 in the valve casing serve, respectively, to interconnect the conduit 48 with the duct 42 and the conduit 52 with said duct.

As to the operation of the valve 22 to place the chamber 18 in communication with the source of air pressure and at the same time to vent the chamber 18 to the atmosphere, when the valve member 24 is rotated counterclockwise from the position disclosed in Figure 2, the duct 42 in the valve member 24 registers with the ports 36 and 44 in the valve casing to connect the chamber 20 to the source of pressure; and this operation of the valve results, by the registering of the duct 32 with the port 34 and a port 37, in the venting of the chamber 18 to the atmosphere via the valve 54 and a manually adjustable bleed valve 57. The valve 57 is incorporated in a conduit 59 to which interconnects the valve 54 and valve 22.

Describing now the flow control valve 54 which constitutes an important feature of our invention, this valve includes a casing 60 preferably adjustably secured to the motor casing by a bracket 61 and bored to slidingly receive a cylindrically shaped valve member 62. The member 62 is relatively tightly fit within the casing 60 to obviate leakage of air from the conduit 52 via the full bodied portion of said member. The valve member 62 is moved back and forth within the casing 60 by means of a rod 64 which is secured at one of its ends to one end of a cross piece 66 the latter being connected at its other end to the piston rod 16. The valve member 62 is provided with a cylindrically shaped bore to receive the rod 64 the diameter of said bore being appreciably greater than the diameter of the rod. As will be apparent from an inspection of Figure 1, thrust members 66 and 67 adjustably mounted on the rod 64 by screws 65, serve, with a movement of the motor piston 14, to contact the valve member 62 to move the same within the casing 60. A pin 68, Figure 2, mounted in the valve casing 60 fits within a keyway 70 in said casing; and this structure prevents a rotation of the valve member 62 as it is moved within the valve casing. Completing the description of the valve 54 the member 62 is provided with recesses 72 and 74 shaped to effect the desired efflux of air from the motor, all as referred to hereinafter.

Describing now the complete operation of the mechanism constituting our invention, to effect a relatively rapid leftward movement of the piston 14 and the work piece connected thereto the valve 22 is actuated to connect the motor compartment 18 with the source of air pressure; and connect the motor compartment 20 with the atmosphere via the valves 53 and 54. The air in the vented compartment 20 will then quickly approach atmospheric pressure and the pressure in the compartment 18 will be quickly brought up to the pressure of the source of air pressure to which the conduit 28 is connected. Then the piston and its connected load will, as soon as the differential of pressures acting on the piston is great enough, be accelerated to the left as indicated by the time, velocity graph disclosed in Figure 2 of the drawings. At some time thereafter the forces acting on the piston will be balanced whereupon, as indicated by the section between A and B of the graph of Figure 2, the velocity of movement of the load will be held constant or substantially constant during another stage of travel of said load; for during the latter stage of operation of the mechanism the air leaving the port 76 in the valve casing 60 is unobstructed; however when the rod 64 picks up the valve member 62 and the left end of the recess 72 passes underneath the port 76 then the rate of flow of air from the port 76 is controlled by the shape of said recess.

As to this last stage of operation of the mechanism, the load is, at point B on the graph, traveling at a relatively high velocity and at this point said load is nearing the end of its stroke. It is accordingly necessary, to avoid undue shock to the load, to control its deceleration as it approaches the end of its stroke. This is effected by the operation of the valve 54 as just described. When the member 62 has moved sufficiently to close the port 76 the air in the compartment 20 is brought down to atmospheric pressure by the fixed leak of air from the adjustable bleed valve 53; however the piston 14 has completed its stroke before the latter operation is completed.

The rightward movement of the load is, in large measure, also controlled by the flow control valve 54 said movement being initiated by the operation of the 4-way valve 22. As with the above described leftward movement of the load the rightward movement is determined by controlling the differential of pressure acting on the piston 14; and this differential is, in large measure, controlled by the rate of efflux of air from the valve 54. Briefly describing this operation the piston 14 is then at its at rest position preparatory to moving to the right, that is the leftward dotted line position of Figure 1. The valve 22 is then operated to place the compartment 20 in communication with the source of air pressure and vent the compartment 18 to the atmosphere. The piston 14 is then moved to the right the mode of its movement being indicated by the graph of Figure 3. In this operation, as with the previously described leftward movement operation of the piston, the velocity of the piston and its connected load is, after the initial acceleration of the load, constant or substantially constant whereupon the load is decelerated depending upon the rate of flow of air from a port 80 in the valve 54. The valve member 62 in this operation does not move until the thrust member 67 contacts said member whereupon the member 62 is moved to bring the recess 74 into registry with the port 80. As with the previously described operation, the bleed valve, that is the valve 57, operates to bleed the air from the compartment 18 to the atmosphere after the piston has completed its stroke; in other words, the pressure in the compartment 18 is brought down to atmospheric after the piston has completed its stroke.

There is thus provided by the double acting pressure differential operated motor mechanism of our invention, a relatively simple and effective mechanism for controlling the mode of movement of a load in the desired direction, as above described, said movement being effected in a plurality of stages in a relatively short period of time there being, in the stroke of movement of the load, no deceleration factor amounting to a shock which would damage said load.

A feature of our invention lies in the actuating means of the flow control valve mechanism 54; for the relatively loose fit between the valve member 62 and the rod 64 insures an effective operation of the valve 54 despite a misalignment of the valve casing 60 and the motor casing 12. Other features of our invention lie in the minimum of valve wear inasmuch as the valve member 62 moves only a relatively short distance in the operation of the valve; and the adjustment of the valve is a simple one in that it is an easy matter to fix the setting of the thrust members 66 and 67.

Although only one embodiment of the invention has been illustrated and described, various changes in the form and relative arrangements of the parts may be made to suit requirements.

We claim:

1. A valve adapted to control the rate of flow of power fluid from a fluid pressure motor and thereby control the mode of movement of the power element of said motor, said valve including a fixed member having a valve member receiving opening therein and also having two power fluid controlling ports therein, a movable valve member reciprocably mounted within said opening and serving, depending upon its position with respect to the fixed valve member, to control the rate of flow of power fluid through one or the other of said ports, and means for actuating the movable valve member to effect the latter control operation including force transmitting means adapted to interconnect the power element of the aforementioned motor with the movable valve member said force transmitting means including a rod reciprocably mounted within the latter valve member, and thrust members secured to said rod and operable, with a movement of the rod, to contact the movable valve member with the operation of the valve.

2. A valve adapted to control the rate of flow of power fluid from a fluid pressure motor and thereby control the mode of movement of the power element of said motor, said valve including a fixed member having a valve member receiving opening therein and also having a plurality of power fluid controlling ports therein, a movable valve member, reciprocably mounted within said opening, shaped to provide a plurality of fluid flow controlling recesses registrable with the aforementioned fluid controlling ports, and serving, depending upon its position with respect to the fixed valve member, to control the rate of flow of power fluid through at least one of said ports; and means for actuating the movable valve member to effect the latter control operation including force transmitting means adapted to interconnect the power element of the aforementioned motor with the movable valve member, said force transmitting means including a rod reciprocably mounted within the latter valve member, and thrust members secured to said rod and operable, with a movement of the rod, to contact the movable valve member with the operation of the valve.

References Cited in the file of this patent
UNITED STATES PATENTS

| | | |
|---|---|---|
| 88,599 | Allen | Apr. 6, 1869 |
| 610,479 | Ewart | Sept. 6, 1898 |
| 612,596 | Spencer | Oct. 18, 1898 |
| 1,877,102 | Whitesell | Sept. 13, 1932 |
| 2,012,273 | Fraser | Aug. 27, 1935 |
| 2,458,290 | Monroe | Jan. 4, 1949 |